United States Patent [19]

Asghar et al.

[11] Patent Number: 4,931,973

[45] Date of Patent: Jun. 5, 1990

[54] METHOD OF GENERATING UPDATED TRANSVERSAL FILTER COEFFICIENTS

[76] Inventors: Safdar M. Asghar, 1208 Rembrandt Dr., Sunnyvale, Calif. 94087; Hwa-Sheng Pyi, 1235 Ayala Dr., Apt. 20, Sunnyvale, Calif. 94086; Dermot Dunnion, 3532 Geneva Dr., Santa Clara, Calif. 95051

[21] Appl. No.: 245,617

[22] Filed: Sep. 19, 1988

Related U.S. Application Data

[62] Division of Ser. No. 891,713, Jul. 30, 1986, Pat. No. 4,800,517.

[51] Int. Cl.$^5$ .............................................. G06F 15/31
[52] U.S. Cl. ................................................. 364/724.16
[58] Field of Search ....................... 364/724.16, 724.19, 364/724.2

[56] References Cited

U.S. PATENT DOCUMENTS

| | | | |
|---|---|---|---|
| 4,349,889 | 9/1982 | van den Elzen et al. | 364/724.19 |
| 4,494,214 | 1/1985 | Bernard et al. | 364/724.19 |
| 4,524,424 | 6/1985 | White | 364/724.16 |
| 4,571,732 | 2/1986 | Pirani et al. | 364/724.16 |
| 4,701,873 | 10/1987 | Schenk | 364/724.16 |
| 4,829,463 | 5/1989 | Kakishita et al. | 364/724.19 |

Primary Examiner—David H. Malzahn
Attorney, Agent, or Firm—Foley & Lardner

[57] ABSTRACT

Method and apparatus for processing digital signals represented as binary words, employing a portion of each word (a "slice") to afford appropriate accuracy. Particularly suited to medium- to high-speed telecommunications applications. In an exemplary transversal filtering operating application, only the high-order slice of the updated coefficient need be used to perform the filtering and yet provide adequate precision. Description of an architecture of a word-slice digital signal processor and applications to adaptive equalization and automatic gain control are provided.

1 Claim, 3 Drawing Sheets (3) MULTIPLYING TWO MOST SIGNIFICANT WORD SLICES TOGETHER

METHOD OF GENERATING UPDATED TRANSVERSAL FILTER COEFFICIENTS

This is a divisional of copending application(s) Ser. No. 891,713 filed on 07/30/86, now U.S. Pat. No. 4,800,517.

The present invention relates generally to word-sliced signal processors in data transmission and receiving systems, such as a modulator-demodulator (modem), and more specifically, to a fixed word-length digital signal processing unit using foreshortened word-slices.

BACKGROUND OF THE INVENTION

Medium- to high-speed data transmission systems for time-invariant or high-frequency channels implemented with dedicated hardware signal processors use digital filtering and least-mean-square adaptive equalizer algorithmic techniques. The precision required to represent the digital sequence in the signal path and filter coefficients may not be the same. For example, with a conventional least-mean-square adaptive equalizer, to make the adaptation noise acceptable, the coefficients of the transversal equalizer should be updated with coefficients having sixteen-bit precision. To cope with this precision requirement, a conventional digital signal processing architecture requires a sixteen by sixteen bit multiplier and a thirty-two bit accumulator to carry out the computation. Although only the high-order eight bits of the updated coefficients are used to perform the filtering, the word-length of the multiplier is determined by the highest precision required.

As another example, the receiver section of a modem data transmission system consists of the analog front end, automatic gain control, echo cancellation, matched filters and processors. Before the automatic gain control and echo cancellation take place, sixteen bits are required to represent the input digital data. However, at this stage, eight-bit coefficients can be used to do the filtering operation. Conventional architectures require a sixteen-bit multiplier to do the filtering because the word-length of the multiplier used is determined by the highest precision required.

Needless storage of the low-order bits consumes extra die area on an integrated circuit chip embodying the architecture and extracts a time penalty during the processing of these excess low-order bits. For instance, the attenuation characteristic and the propagation velocities experienced by the various frequency components in a signal are not constant, resulting in distortion in a transmitted signal. Initial training time is significant because it reduces the net data throughput. (See, e.g. *Digital, Analog, and Data Communication*, by William Sinneman, Reston Publishing Company, Reston, VA, 1982, ISBN 0-8359-1301-5 at pp. 148-152.) It is therefore a principal object of this invention to provide a word-sliced signal processor that uses shorter word-length hardware to represent and process digital signals while maintaining a desired level of accuracy. Another object of this invention is to reduce the chip area required for implementation of the signal precessing algorithms. Another object of this invention is to eliminate unnecessary computation and decrease cycle time so as to shorten processing time for adaptive equalization of the signal.

SUMMARY OF THE INVENTION

Words representing digital signals are processed according to the instant invention by "slicing" the signals into smaller portions and processing the individual portions. A signal processor employing the word-sliced method of the instant invention requires smaller-capacity registers, multipliers and accumulators and consequently operates at higher speeds than prior art digital signal processors.

The invention is particularly suited to medium- to high-speed telecommunication applications because the word precision required to represent the digital sequence in the signal path need not be the same as the precision required to represent the coefficients used when processing the digital sequence. In a process using a sixteen-level quantizer, for instance, each level can be represented by a four-bit word length. Consequently, the word-length of the input sequence need not be much more than four bits.

With an n-bit word-slice, a processor of the instant invention can employ an n- by n-bit multiplier and a 2n-bit accumulator to perform the digital signal processing. Two n-bit slices are used to store updated coefficients. In an exemplary transversal filtering operation application, only the high-order slice of the updated coefficient need be used to perform the filtering and yet provide adequate precision.

An architecture of a word-slice digital signal processor is described and several applications of the processor to adaptive equalization and automatic gain control are provided.

DESCRIPTION OF THE PREFERRED EMBODIMENT

While this invention is applicable to the processing of a wide variety of digital signals, the following description illustrates the invention by its use in processing digital signals for an adaptive equalizer and automatic gain control.

Figure 1:
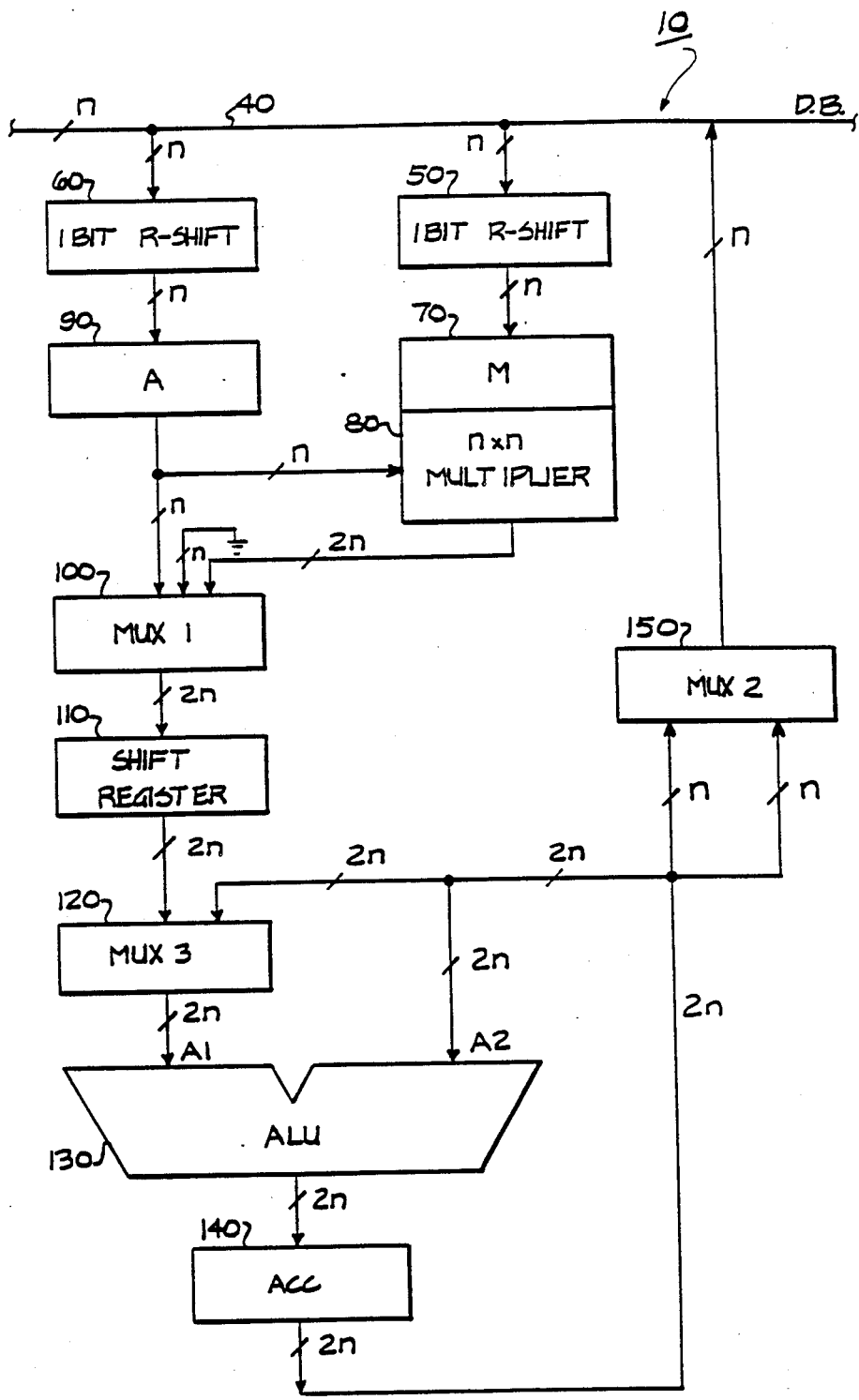
FIG. 1 is a block diagram of a preferred embodiment of a digital signal processor according to the invention.

FIG. 1 is a block diagram of a digital signal processor (DSP) 10 employing the invention. Bus 40 is used to conduct signals into and out of the digital signal processor 10. While the various data signal paths are shown in FIG. 1, various control signal paths from a control portion of the DSP 10, not shown, to the elements shown in FIG. 1 are not shown since they are conventional, as will be appreciated by those skilled in the art. Bus 40 is a multiple-conductor bus carrying n signals in parallel as is denoted on FIG. 1 by a hash-mark and the adjacent symbol "n." Other signal paths shown in FIG. 1 are multiple-conductor paths and are denoted by a hash-mark and a symbol adjacent thereto indicating the number of signals the path conducts in parallel. Signals may be conducted from bus 40 to a shift register 50 and a shift register 60. Each of these registers stores an n-bit quantity received from bus 40 and may selectively shift its contents one bit to the right, or not, depending on reception of a right-shift control signal from a control portion of the DSP 10, not shown. Signals are conducted from register 50 to a multiplier (M) register 70, which is connected, in turn, to an n- by n- bit multiplier 80.

Signals are conducted from register 60 to a (A) register 90, which is connected to the n by n bit multiplier 80. Multiplier 80 generates the 2n-bit product of the n-bit multiplier received from register 70 and the n-bit multiplicand received from the A register 90. Signals are also conducted from A register 90 to the high-order n input terminals of a first set of input terminals of a multiplexer (MUX 1) 100. The low-order n terminals of the first set of 2n input terminals are connected to ground - 0 volts. Multiplexer 100 selectively conducts to a set of 2n output terminals the signals received at the 2n input terminals from register 90 or the signals received at a second set of 2n input terminals from the n- by n-bit multiplier 80. Multiplexer 100 receives select control signals from a control portion of the DSP 10, not shown, which determine the set of signals applied to the input terminals which will be conducted to the output terminals.

The 2n signals generated at the output terminals of MUX 100 are conducted to a 2n-bit shift register 110. The shift register 110 may selectively shift its contents any number of bits either left or right, arithmetically or logically, upon reception of a shift control signal received from the control portion of the DSP 10.

The 2n-bit register 110 is a first set of 2n input terminals of a multiplexer (MUX 3) 120. A set of 2n output terminals of multiplexer 120 are connected to a first set of 2n input terminals (A1) of an arithmetic-logic unit (ALU) 130.

A set of 2n output terminals of ALU 130 are connected to an accumulator (ACC) register 140 which is, in turn, connected to a second set of 2n input terminals (A2) of the ALU 130. The accumulator 140 stores the 2n-bit results of an operation performed by the ALU 130 and the high-order n̄ bits stored therein are also conducted from accumulator 140 to a first set of n input terminals of a multiplexer (MUX 2) 150. The low-order n bits stored in accumulator 140 are conducted to a second set of n input terminals of MUX 2 150. The n signals generated at a set of n output terminals of MUX 2 are conducted to the n-bit signal bus 40. A control signal received by MUX 2 150 determine whether the high-order or low-order n bits stored within accumulator 140 will be conducted to bus word 40. The 2n-bit contents of accumulator 140 are also conducted to a second set of 2n input terminals of MUX 3 120. MUX 3 120 receives a control signal, not shown, which determines whether the 2n-bit contents of the shift register 110 or the accumulator 140 will be applied at the A1 terminals of ALU 130.

Figure 2A:
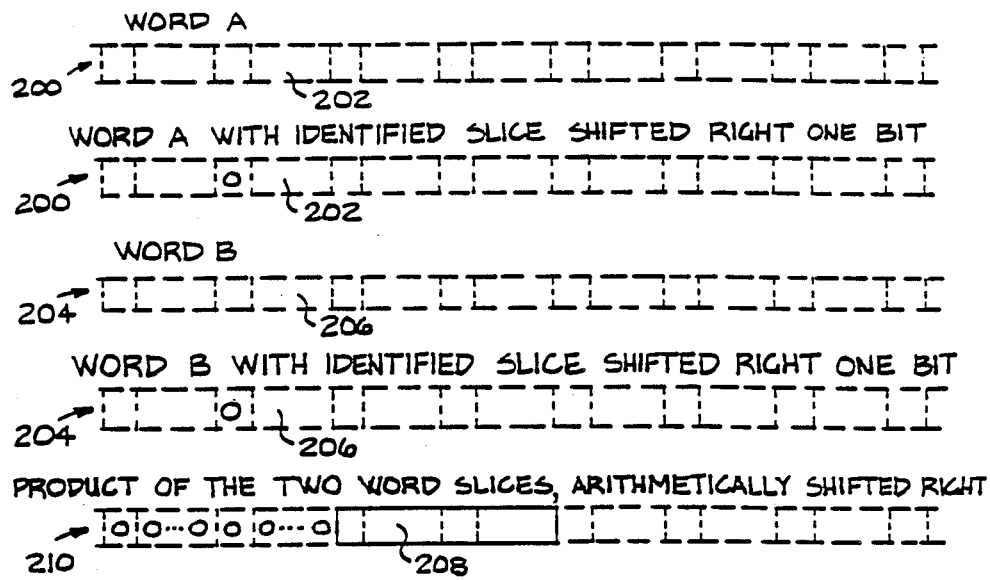
FIGS. 2A, 2B and 2C are figures schematically showing how the digital signal processor of the instant invention performs slice-oriented operations.
Figure 2B:
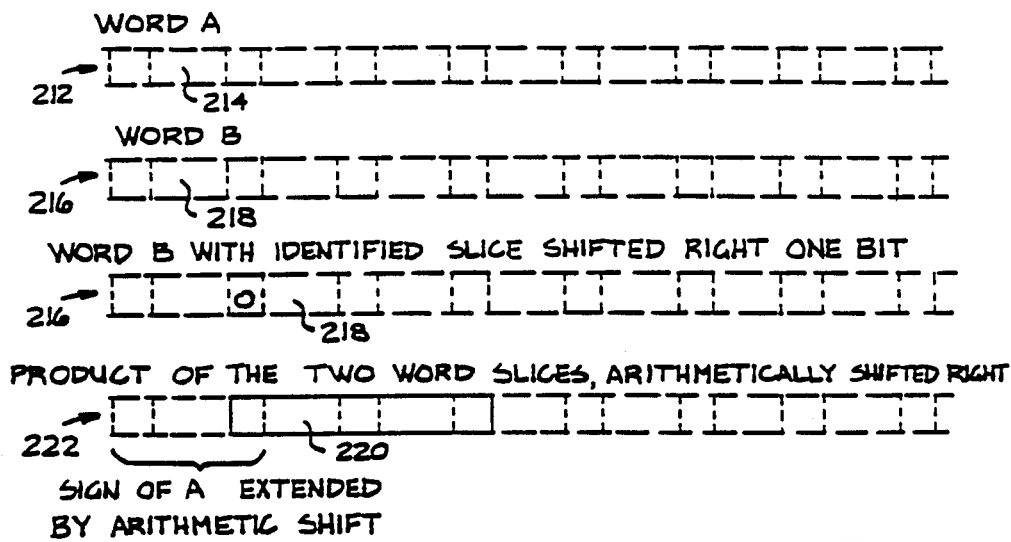
Figure 2C:
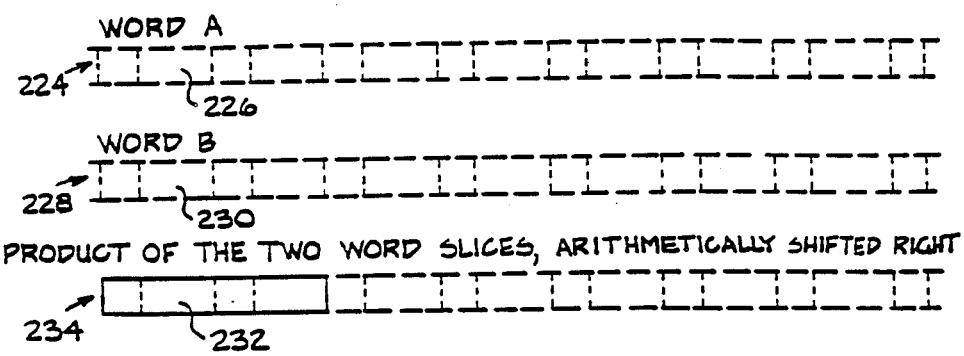

The operation of DSP 10 is best understood with reference to FIG. 2 in which word-sliced multiplications are schematically illustrated. While the operation of the DSP 10 will be described in terms of the elements shown in FIG. 1, the storage capacity of some of these elements as shown in FIG. 1 need to be increased to implement the operations to be described. Bus 40 carries signals to be processed by DSP 10 in n-bit "slices," each signal represented by a "word," consisting of several n-bit slices, conducted serially on bus 40, each bit of the slice conducted in parallel on the n-bit bus 40. Three cases are illustrated in FIG. 2: FIG. 2A corresponds to multiplying two slices neither the most-significant slice of a word; FIG. 2B corresponds to multiplying two slices one being a most-significant slice, the other not being a most-significant slice; and FIG. 2C corresponds to multiplying two most-significant slices. An n-bit slice is schematically represented in FIG. 2 as the portion between a first and a third vertical line; a second vertical line between them separating the most-significant bit position of the slice from the remaining (n−1) lesser-significant bit positions.

With reference to FIG. 2A, a word A 200 is illustrated comprising several n-bit slices, having a not most-significant n-bit slice 202. The word A 200 is also illustrated wherein slice 202 is logically right-shifted one bit. A ZERO is now contained in the most-significant bit position of slice 202. This operation can be performed by the DSP 10 by conducting signals representing slice 202 from bus 40 to shift register 60 and performing a one-bit right shift of the contents of register 60. The resulting contents of register 60 can then be conducted to A register 90.

A word B 204 is illustrated in FIG. 2A comprising several n-bit slices; having a not most-significant n-bit slice 206. Word B 204 is also illustrated in which slice 206 has been logically right-shifted, such operation could be performed by the register 50 of DSP 10 and the result stored in M register 70.

Multiplier 80 of the DSP 10 can generate the 2n-bit product shown in FIG. 2A as the contiguous slices 208.

This 2n-bit product 208 is conducted via MUX 1 100 to the shift register 110 where it is arithmetically right-shifted 2n bits to form the word 210. The resulting word 210 accordingly has been scaled so that the product portion 208 is properly located within the word. The resulting scaled word 210 is conducted to the A1 input terminals of the ALU 130 for arithmetic combination with a previously-generated result applied to the A2 input terminals.

The 2n-bit arithmetic combination generated by ALU 130 is conducted to the accumulator 140 where it can be applied via MUX 3 120 to the A1 terminals of the ALU 130, to the A2 terminals of the ALU 130, or via MUX 2 150 to the bus 40.

With reference to FIG. 2B, a word A 212 is illustrated comprising several n-bit slices, having a most-significant n-bit slice 214. This operation can be performed by the DSP 10 by conducting signals representing slice 214 from bus 40 to shift register 60 and not performing a one-bit right shift of the contents of register 60. The contents of register 60 can then be conducted to A register 90.

A word B 216 is illustrated in FIG. 2B comprising several n-bit slices; having a not most-significant n-bit slice 218. Word B 216 is also illustrated in which slice 218 has been logically right-shifted, such operation could be performed by the register 50 of DSP 10 and the result stored in M register 70.

Multiplier 80 of the DSP 10 can generate the 2n-bit product shown in FIG. 2B as the contiguous slices 220.

The 2n-bit product 220 is conducted via MUX 1 100 to the shift register 110 where it is arithmetically right-shifted n bits to form the word 222. The resulting word 222 accordingly has been scaled so that the product portion 220 is properly located within the word. The resulting scaled word 222 is conducted to the A1 input terminals of the ALU 130 for arithmetic combination with a previously-generated result applied to the A2 input terminals.

The 2n-bit arithmetic combination generated by ALU 130 is conducted to the accumulator 140 where it can be applied via MUX 3 120 to the A1 terminals of the ALU 130, to the A2 terminals of the ALU 130, or via MUX 2 150 to the bus 40.

With reference to FIG. 2C, a word A 224 is illustrated comprising several n-bit slices, having most-significant n-bit slice 226. This operation can be performed by the DSP 10 by conducting signals representing slice 226 from bus 40 to shift register 60 and not performing a one-bit right shift of the contents of register 60. The contents of register 60 can then be conducted to A register 90.

A word B 228 is illustrated in FIG. 2C comprising several n-bit slices; having a most-significant n-bit slice 230. Such operation could be performed by transfer of word B 230 to register 50 of the DSP 10 and then stored in M register 70.

Multiplier 80 of the DSP 10 can generate the 2n-bit product shown in FIG. 2C as the contiguous slices 232.

The 2n-bit product 232 is conducted via MUX 1 100 to the shift-register 110 where it is not arithmetically right-shifted, forming the word 234. The resulting word 234 need not be scaled so that the product portion 232 is properly located within the word. The word 234 is conducted to the A1 input terminals of the ALU 130 for arithmetic combination with a previously-generated result applied to the A2 input terminals.

The 2n-bit arithmetic combination generated by ALU 130 is conducted to the accumulator 140 where it can be applied via MUX 3 120 to the A1 terminals of the ALU 130, to the A2 terminals of the ALU 130, or via MUX 2 150 to the bus 40.

The operation of the DSP 10 of the instant invention will be further illustrated by its application in adaptive transversal equalization and automatic gain controlling. First, the adaptive transversal filter function is described by the equations:

$$Ai(n+1) = Ai(n) + u * e(n) * X(n-i), i = 0, 1, 2, \ldots, N;$$

$$Y(n) = \sum_{k=0}^{N} (Ak(n) * X(n-k))$$

where the $Ai(n)$ are the tap weights of the adaptive transversal filter at the nth sample point, $Y(n)$ is the output, $X(n)$ is the input sample, $e(n)$ is the error term between the channel response and the output of the transversal filter, and u is a constant specifying the step size.

With the word-sliced method of the instant invention, updating of the coefficient Ai can be performed with a precision of 16 bits and yet use an 8 by 8 bit multiplier 80 and 16-bit accumulator 140 while conventional methods would require a 16 by 16 bit multiplier and a 32-bit accumulator. This is because in the adaptation equation, the 16-bit Ai coefficients are represented by two 8-bit slices, while the step, error, and equalizer states are represented by a single 8-bit slice.

In general then, to update the 2n-bit coefficients of a transversal filter the signal processor 10 conducts the n-bit error term via bus 40 into register 70, by conducting this signal through shift register 50 without shifting. In the same manner, signals representing the n-bit ith state of the filter $X(n-i)$ are conducted via bus 40 to register 90 passing through shift register 60 without shifting. Multiplier 80 multiplies the contents of register 70 by the contents of register 90, obtaining a 2n-bit product. Multiplexer 100 is set to conduct the product to shift register 110. The product, without shifting, is conducted via multiplexer 120 to the set of input terminals A1 of ALU 130, which conducts the product, unchanged, to the 2n-bit accumulator 140.

The most-significant n bits of accumulator 140 are then conducted to the multiplier register 70. The n-bit step-size u is then conducted via bus 40 to shift register 60, and conducted therefrom, without shifting to A register 90. Multiplier 80 then multiplies the contents of register 70 by the contents of register 90. Multiplexer 100 is set to conduct the 2n-bit product to shift register 110, and therefrom to multiplexer 120. Multiplexer 120 is set to conduct the 2n signal lines from register 110 to the set of terminals A1 of the ALU 130, which transmits the product to the accumulator 140 without performing any operation on it.

The signal processor 10 then conducts the most-significant n bits of the previously calculated coefficient Ai via bus 40 to shift register 60, and therefrom, without shifting, to register 90. The signals from register 90 occupy the n most-significant bits of the 2n signals. There signals are conducted to shift register 110 which then performs no shift. Multiplexer 120 conducts the 2n signals from shift register 110 to the set of terminals A1 of ALU 130. The contents of the accumulator 140 is conducted to the set of input terminals A2 of ALU 130. This quantity represents the product of u, $X(n-i)$ and $e(n)$. The ALU 130 then adds the two values and the sum is conducted to the accumulator 140. The signal processor 10 then conducts the n least-significant n bits of the previously-calculated coefficient A via bus 40 to shift register 60, which are conducted, without shifting, to register 70. Multiplexer 100 is set to conduct the 2n signals from register 70. The signals from register 70 occupying the n most-significant bits of the 2n signals. These signals are conducted to shift register 110 which then performs an n-bit arithmetic right shift. Multiplexer 120 conducts the 2n signals from shift register 110 to the set of terminals A1 of ALU 130. The contents of accumulator 140 is conducted to the set of input terminals A2 of ALU 130. The ALU 130 adds the two values, and conducts the sum to the accumulator 140. Multiplexer 150 conducts the n most-significant bits of the accumulator 140 to the n-bit signal bus 40. Then multiplexer 150 is set to conduct the n least-significant bits of the accumulator 140 to the n-bit signal bus 40.

To determine the 2n-bit equalizer output of the transversal filter operation from the 2n-bit filter coefficients Ai, the digital signal processor 10 clears the accumulator 140 and then performs the following operations repetitively until desired accuracy is obtained. It is typically sufficient to perform the operations twenty times. The n most-significant bits of an equalizer coefficient are conducted from bus 40 by the signal processor into shift register 50. Shift register 50 conducts these signals directly, without shifting, to multiplier register 70. Next, the n most-significant bits of the associated input of the filter $X(n-k)$ are conducted from bus 40 to shift register 60, and therefrom to register 90 without shifting. The n by n multiplier 80 then multiplies the contents of register 70 and register 90.

Multiplexer 100 conducts the 2n signals representing the product from the multiplier to the shift register 110. Multiplexer 120 is then set to conduct signals from shifter 110 to the set of terminals A1 of the ALU 130. Shift register 110 conducts the product without shifting via multiplexer 120 to ALU 130 and therefrom to accumulator 140. The contents of the accumulator 140 is conducted to the set of input terminals A2 of ALU 130.

The ALU 130 then adds the quantities represented by the signals applied to terminals A1 and A2 and the sum is conducted to the accumulator 140.

The above sequence of operations is repeated until the desired accuracy is obtained, with the result that accumulator 140 contains the 2n-bit equalizer output value. The n most significant bits stored in the accumulator 140 are then transmitted to the bus 40 via multiplexer 150.

Figure 3:
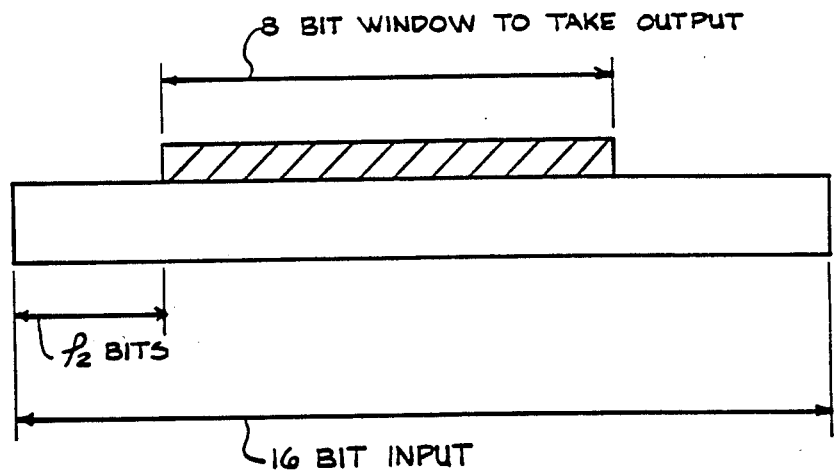
FIG. 3 is a diagram showing the selection of an 8-bit window from a 16-bit signal effecting an automatic gain control operation.

With reference to FIG. 3, illustrating the broad application of the present invention, an automatic gain control (AGC) function can be realized by the word-sliced DSP 10. The AGC function can be considered as a signal processor that reduces a stream of input signals requiring 16-bit representation to a stream of output signals having an 8-bit representation. The signal energy is represented by the high-order 8-bit byte of the input signal and then used as the measured value to determine a "window" of the 16-bit representation of the input from which an 8-bit output representation is taken. A quantity, k, indicates the starting point of the 8-bit window within the 16-bit input. To determine the output signal for an automatic gain control device operating on a 2n-bit signal with n-bit output, the signal processor 10 receives the 2n-bit input signal in n-bit portions. The n most-significant bit portion of the signal is conducted from bus 40 to register 60, which conducts directly to register 90, without shifting. Register 90 conducts the n-bit portion via multiplexer 100 to shift register 110, being the n most-significant bits of the 2n output signals stored in register 110.

Register 110 arithmetically shifts the portion k bits to the right, with k determined by the measured signal strength. The shifted portion is conducted via multiplexer 120 to the set of terminals A1 of the ALU 130. ALU 130 conducts this 2n-bit quantity to accumulator 140. The contents of the accumulator 140 is conducted to the set of input terminals A2 of ALU 130.

The signal processor 10 next receives the n-bit least-significant portion of the signal at register 60. This n-bit portion is transmitted directly to register 90, and via multiplexer 100, as the n most-significant bits of the 2n signals from to register 110. Register 110 logically shifts its contents n+k bits to the right, and transmits the result via multiplexer 120 to the set of terminals A1 of ALU 130. ALU 130 then adds the two quantities represented by the signals applied to terminals A1 and A2 conducts this sum to the accumulator 140. Next, multiplexer 150 is set to conduct the least significant n-bit portion of the accumulator 140 to the bus 40.

We claim:

1. A method of continuously generating updated 2n-bit adaptive transversal filter coefficients for a transversal filter having N stages, said method being arranged to implement the following relationships:

$$Ai(j + 1) = Ai(j) + u^*e(j)^*X(j - i), i = 0, 1, 2, \ldots, N - 1,$$

and $$Y(j) = \sum_{j=0}^{N-1} Ai(j)^*X(j - i)$$

where Ai(j) are the 2n-bit coefficients of the adaptive transversal filter, Y(j) is a 2n-bit filter output, X(j−i) is an n-bit input sample at an ith filter stage, e(j) is an n-bit error term equal to the difference between a predetermined output standard and the output of said transversal filter, and u is an n-bit constant, said method comprising the steps of:

(a) providing an nxn bit multiplier;
(b) conveying said n-bit error term e(j) to said multiplier;
(c) conveying the n-bit input sample at an ith filter stage to said multiplier;
(d) multiplying said n-bit error term e(j) by said n-bit input sample at an ith filter stage X(j−i) to obtain a first 2n-bit product;
(e) storing the most-significant n bits of said first 2n-bit product;
(f) conveying said most-significant n bits of said first 2n-bit product to said multiplier;
(g) conveying said n-bit constant to said multiplier;
(h) multiplying the most-significant n bits of said first 2n-bit product by said n-bit constant u to obtain a second 2n-bit product;
(i) providing a 2n-bit adder;
(j) conveying the most-significant n bits of an immediately preceding 2n-bit coefficient Ai(j) to said adder;
conveying said 2n-bit second product to said adder;
(l) adding the most-significant n bits of said immediately preceding 2n-bit coefficient Ai(j) to said second 2n-bit product to obtain a 2n-bit first partial sum;
(m) providing a 2n-bit shifter;
(n) conveying the least-significant n bits of said 2n-bit immediately preceding coefficient Ai(j) to said shifter;
(o) shifting said least-significant n bits in said shifter to the right by n bits;
(p) conveying the least-significant n bits of step (o) to said 2n-bit adder;
(q) adding the least-significant n bits of step (o) to said 2n-bit first partial sum to generate an updated 2n-bit transversal filter coefficient Ai(j−1);
(r) repeating steps (a) through (q) for generating a respective updated 2n-bit coefficient Ai(j−1) for each repective filter stage of said N stages;
(s) conveying to said nxn bit multiplier the most-significant n bits of said coefficient Ai(j) and its corresponding n-bit input sample X(j−i);
(t) multiplying said most-significant n bits of said filter coefficient Ai(j) by its corresponding input sample X(j−i) to generate a 2n-bit filter output;
(u) repeating steps (s) and (t) for each said filter stage;
(v) providing a 2n-bit accumulator;
accumulating the filter outputs for each said stage obtained in step (t) and said 2n-bit accumulator to generate the 2n-bit filter output Y(j);
(x) comparing the most-significant n bits of each said filter output Y(j) with a predetermined n-bit standard for generating an updated error term; and
(y) repeating steps (a) through (x).

* * * * *

UNITED STATES PATENT AND TRADEMARK OFFICE
CERTIFICATE OF CORRECTION

PATENT NO. : 4,931,973

DATED : June 5, 1990

INVENTOR(S) : Safdar M. Asghar, et al

It is certified that error appears in the above-identified patent and that said Letters Patent is hereby corrected as shown below:

On the title page item [73] should read as follows:

--ADVANCED MICRO DEVICES, INC.
Sunnyvale, Calif.

Signed and Sealed this

Twenty-fourth Day of September, 1991

*Attest:*

HARRY F. MANBECK, JR.

*Attesting Officer*   *Commissioner of Patents and Trademarks*